United States Patent
Ouyang

(10) Patent No.: US 9,746,395 B2
(45) Date of Patent: Aug. 29, 2017

(54) EXHAUST FUME ISOLATOR FOR A GAS TURBINE ENGINE

(71) Applicant: Solar Turbines Incorporated, San Diego, CA (US)

(72) Inventor: Xing Ouyang, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 110 days.

(21) Appl. No.: 14/719,159

(22) Filed: May 21, 2015

(65) Prior Publication Data

US 2016/0341633 A1  Nov. 24, 2016

(51) Int. Cl.
*G01M 15/14* (2006.01)
*G01M 15/02* (2006.01)
*F01D 1/00* (2006.01)

(52) U.S. Cl.
CPC .............. *G01M 15/14* (2013.01); *F01D 1/00* (2013.01); *G01M 15/02* (2013.01)

(58) Field of Classification Search
CPC ...... F01N 13/08; F01N 13/00; F01N 2270/10; F01N 3/0215; F01N 3/0226; F01N 2330/10; F01N 2330/12; F01N 2330/14; F01N 2330/06; B01D 53/9454; Y02T 10/22; Y02T 10/20
USPC ...................................................... 73/116.04
See application file for complete search history.

(56) References Cited

U.S. PATENT DOCUMENTS

| | | | |
|---|---|---|---|
| 4,637,297 A * | 1/1987 | Anneken | B60H 3/0085 180/68.2 |
| 4,964,298 A | 10/1990 | Matsushita | |
| 5,996,936 A * | 12/1999 | Mueller | B64D 33/04 239/265.17 |
| 8,155,917 B2 | 4/2012 | Maegawa | |
| 8,256,307 B2 | 9/2012 | Graze, Jr. et al. | |
| 8,387,471 B2 | 3/2013 | Samaras et al. | |
| 2003/0037675 A1* | 2/2003 | Gillingham | B01D 39/1623 95/280 |
| 2004/0045271 A1* | 3/2004 | Horner | F01D 25/30 60/39.5 |
| 2005/0050898 A1* | 3/2005 | Noda | F01D 5/081 60/772 |
| 2008/0209898 A1* | 9/2008 | Succi | B01D 45/08 60/311 |

(Continued)

FOREIGN PATENT DOCUMENTS

| EP | 1600772 A1 | 11/2005 |
|---|---|---|
| EP | 2295950 A1 | 3/2011 |

*Primary Examiner* — Lisa Caputo
*Assistant Examiner* — Philip Cotey
(74) *Attorney, Agent, or Firm* — Procopio, Cory, Hargreaves & Savitch LLP

(57) ABSTRACT

Exhaust ducting for a gas turbine engine includes a lower plenum, an upper plenum, an exhaust fume isolator, and an inner duct seal positioned between the upper plenum and the exhaust fume isolator. The lower plenum is in flow communication with an exhaust collector of the gas turbine engine. The upper plenum is adjacent and in flow communication with the lower plenum. The exhaust fume isolator includes an isolation chamber and mixed exhaust ducting. The isolation chamber is adjacent the upper plenum and in flow communication with the enclosure. The mixed exhaust ducting is in flow communication with the isolation chamber and extends from the isolation chamber to the enclosure exhaust.

18 Claims, 3 Drawing Sheets

(56) References Cited

U.S. PATENT DOCUMENTS

| | | | | |
|---|---|---|---|---|
| 2011/0138772 A1* | 6/2011 | Zitouni | ............... | F01D 25/30 60/226.1 |
| 2012/0216543 A1* | 8/2012 | Eleftheriou | ............... | F02C 7/08 60/772 |
| 2013/0101401 A1* | 4/2013 | Shimizu | ............... | F01D 11/04 415/175 |
| 2013/0223985 A1* | 8/2013 | Hashimoto | ............... | F01D 11/001 415/111 |
| 2013/0315721 A1* | 11/2013 | Lawson, Jr. | ............... | F01D 25/30 415/182.1 |
| 2014/0157778 A1* | 6/2014 | Ponnuraj | ............... | F01D 25/305 60/694 |
| 2014/0286763 A1* | 9/2014 | Munshi | ............... | F02C 7/12 415/178 |

* cited by examiner

EXHAUST FUME ISOLATOR FOR A GAS TURBINE ENGINE

TECHNICAL FIELD

The present disclosure generally pertains to gas turbine engines, and is directed toward an exhaust fume isolator for gas turbine engines.

BACKGROUND

Gas turbine engines include compressor, combustor, and turbine sections. The exhaust fumes exiting the turbine section are at high temperatures. Exhaust fumes leaking into an enclosed cell containing the gas turbine engine may present a safety hazard for anyone entering into the enclosed cell due to high concentrations of the exhaust fumes and the high temperature of the exhaust fumes.

U.S. Pat. No. 4,964,298 to Matsushita discloses a device for controlling the air pressure in the low pressure environmental testing chamber for self-propelled vehicles. The device includes a first air pipe having an air suction port in the vicinity of a discharge opening of a discharge duct of the vehicle and being connected to a main air pipe, a second air pipe having an air inlet in the testing chamber and being connected to a main air valve, a main air blower mounted halfway in the main air pipe, a first air silencer provided in the main air pipe at the air discharge side of the air blower, and a branched pipe having a second silencer at an outside air intake. The branched pipe also has a second pressure regulating valve halfway between the second silencer and the end connected to the main air pipe.

The present disclosure is directed toward overcoming one or more of the problems discovered by the inventors or that is known in the art.

SUMMARY OF THE DISCLOSURE

Exhaust ducting for a gas turbine engine cell is disclosed. The gas turbine engine cell includes an enclosure with an enclosure exhaust, a ventilator, and a gas turbine engine located within the enclosure and including an exhaust collector. In embodiments, the exhaust ducting includes a lower plenum, an upper plenum, an exhaust fume isolator, and an inner duct seal. The lower plenum is adjacent and in flow communication with the exhaust collector. The upper plenum is adjacent and in flow communication with the lower plenum. The exhaust fume isolator includes an isolation chamber and mixed exhaust ducting. The isolation chamber is adjacent the upper plenum and in flow communication with the enclosure. The mixed exhaust ducting is in flow communication with the isolation chamber. The mixed exhaust ducting extends from the isolation chamber to the enclosure exhaust and terminates adjacent the ventilator. The inner duct seal is positioned between the upper plenum and the isolation chamber.

DETAILED DESCRIPTION

The systems and methods disclosed herein include an exhaust fume isolator for the exhaust ducting of a gas turbine engine. In embodiments, the exhaust fume isolator includes an isolation chamber in flow communication with a mixed air exhaust and an enclosure for the gas turbine engine. The exhaust fume isolator is also separated from an exhaust plenum by an inner duct seal. The mixed air exhaust is configured with a negative pressure, drawing air into the isolation chamber from the enclosure. The air in the isolation chamber mixes with any exhaust fume leakage that leaks passed the inner duct seal into the isolation chamber before being drawn out through the mixed air exhaust. Mixing any exhaust fume leakage with air in the isolation chamber and drawing the mixed exhaust out through the mixed exhaust may prevent exhaust fume leakage from entering the enclosure, which may improve the safety of the enclosure.

Figure 1:
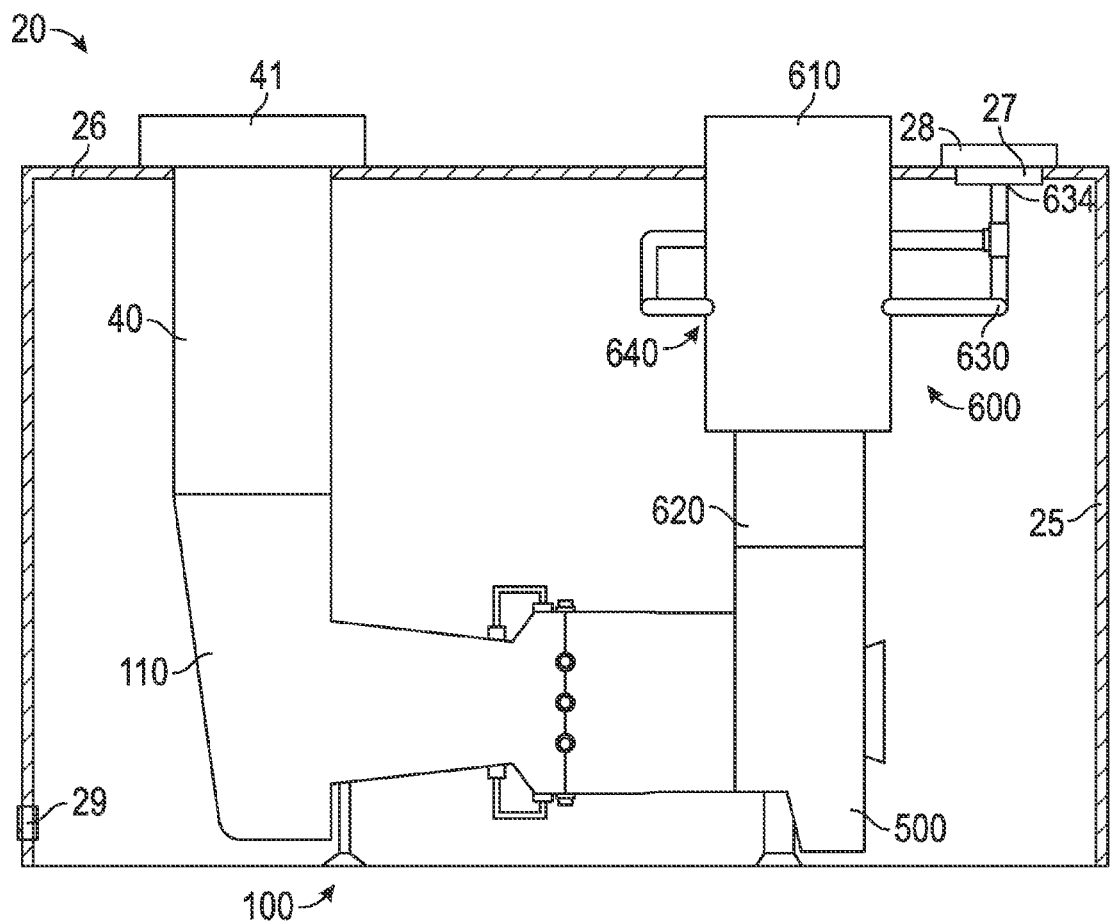
FIG. 1 is a schematic illustration of an enclosed gas turbine engine cell.

FIG. 1 is a schematic illustration of an enclosed gas turbine engine cell 20. The gas turbine engine cell 20 may be for the operation or testing of the gas turbine engine 100. The gas turbine engine cell 20 includes an enclosure 25, a gas turbine engine 100, inlet ducting 40, and exhaust ducting 600. The enclosure 25 includes, inter alia, a roof 26, an enclosure air inlet 29 and an enclosure exhaust 27 that provide ventilation to the enclosure 25. The enclosure exhaust 27 includes a ventilator 28, such as an exhaust fan, that draws air through the enclosure 25 for ventilation.

The gas turbine engine includes an inlet 110 and an exhaust 500. The inlet ducting 40 couples to the inlet 110 and extends from the inlet 110 to the exterior of the enclosure 25 to provide a path for air to enter the gas turbine engine 100. The inlet ducting 40 generally includes an intake filter 41 to prevent debris and other foreign objects from entering the gas turbine engine 100.

The outlet ducting 600 provides a path for the exhaust fumes of the gas turbine engine 100 to exit the enclosure 25 and includes an outer duct 610, an inner duct 620, and an exhaust fume isolator 640. The outer duct 610 extends up through the roof 26 of the enclosure 25. The inner duct 620 couples to the exhaust 500 of the gas turbine engine 100 and may be configured to extend partially into the outer duct 610 in a telescoping configuration. The inner duct 620 may be movable within outer duct 610 in a telescoping manner, which may facilitate installation of the gas turbine engine 100 into the cell 20. The mixed exhaust ducting 630 includes one or more ducts extending from the outer duct 610 to the enclosure exhaust 27. The exhaust fume isolator 640 includes mixed exhaust ducting 630 that includes a mixed exhaust outlet 634. The mixed exhaust outlet 634 is located distal to the outer duct 610 and adjacent the ventilator 28 within the enclosure exhaust 27.

Figure 2:
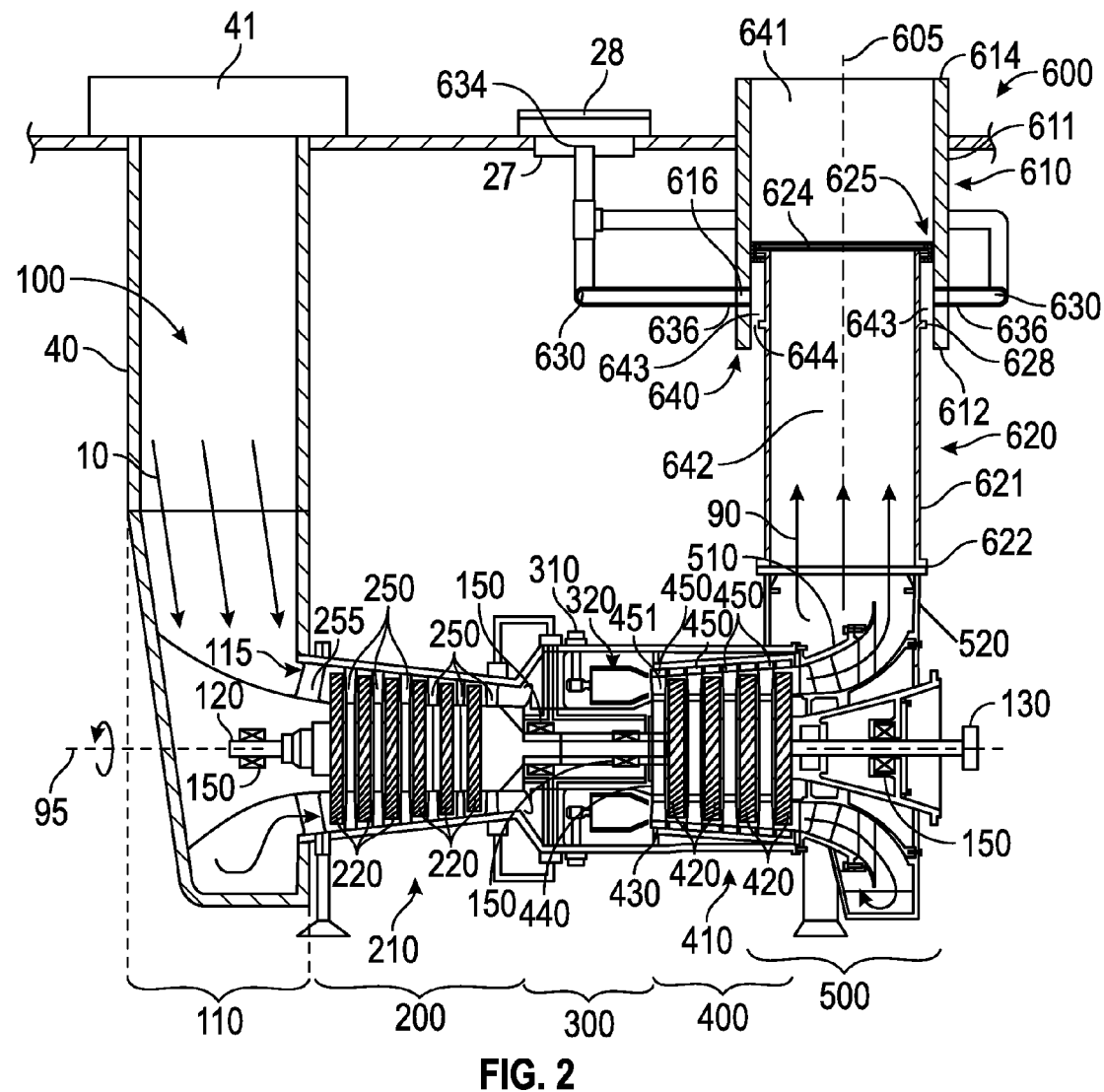
FIG. 2 is a schematic illustration of a portion of the gas turbine engine cell of FIG. 1 including the exhaust ducting and an exemplary gas turbine engine.

FIG. 2 is a schematic illustration of a portion of the gas turbine engine cell 20 of FIG. 1 including the exhaust ducting 600 and an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150).

The center axis 95 may be common to or shared with various other engine concentric components. The disclosure may also generally reference an exhaust axis 605, which may be generally defined as the concentric axis of the outer duct 610 and the inner duct 620. All references to radial, axial, and circumferential directions and measures may refer to either the center axis 95 or to the exhaust axis 605, unless specified otherwise, and terms such as "inner" and "outer" generally indicate a lesser or greater radial distance from the center axis 95 or from the exhaust axis 605.

Figure 3:
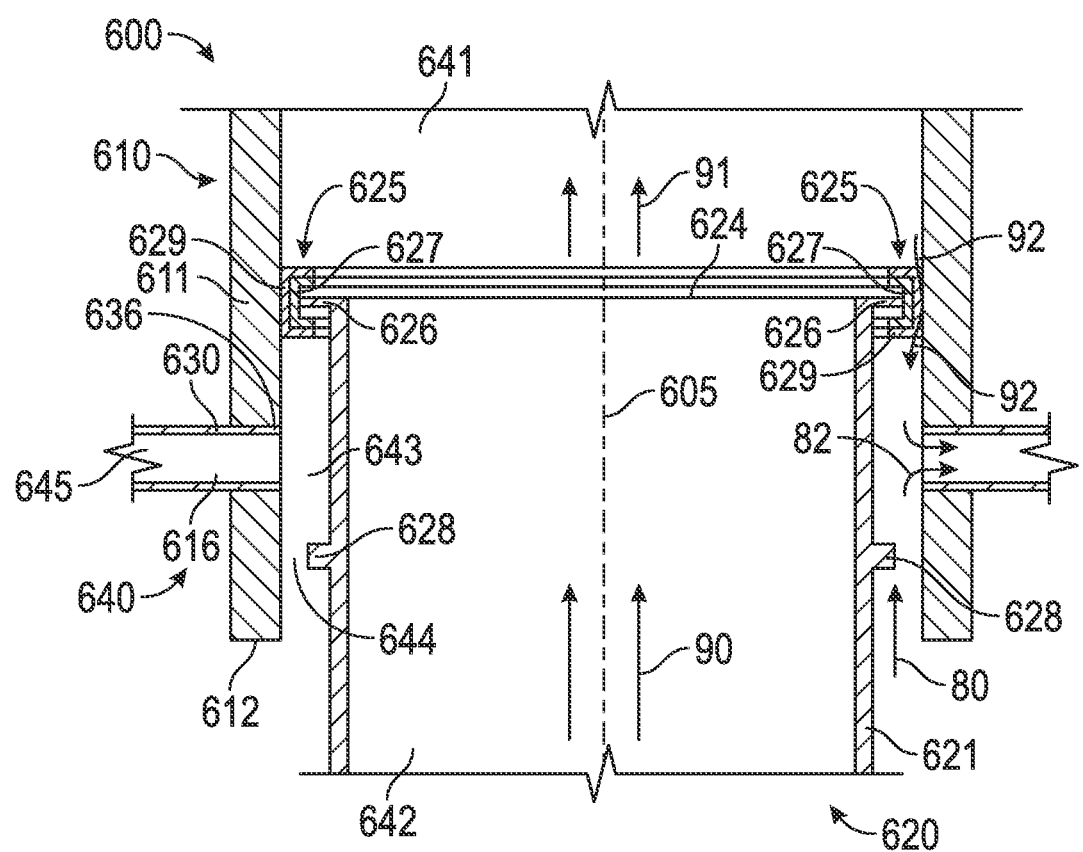
FIG. 3 is a schematic illustration of the exhaust fume isolator of FIG. 2.

FIG. 3 is a schematic illustration of the exhaust fume isolator 640 of FIG. 2. Referring to FIGS. 2 and 3, the outer duct 610 includes an outer duct body 611 and one or more mixed exhaust ports 616. In the embodiment illustrated, the outer duct body 611 includes a hollow cylinder shape revolved about the exhaust axis 605. In other embodiments, the outer duct body 611 may include other hollow prism shapes, such as a hollow right triangular prism or a hollow right square prism. The outer duct body 611 includes an outer duct first end 612 and an outer duct second end 614. The outer duct first end 612 is located within the enclosure 25 while the outer duct second end 614 is located outside of the enclosure 25. The outer duct 610 may be fixed to the enclosure 25, such as to the roof 26.

The one or more mixed exhaust ports 616 are located in the outer duct body 611 and are located between the outer duct first end 612 and the roof 26. The exhaust ducting 630 is configured to connect to the outer duct body 611 at the mixed exhaust ports 616 and may be joined to the outer duct body 611 by a metallurgical bond, such as a weld.

The inner duct 620 includes an inner duct body 621, an inner duct seal 625, and an inner duct ring 628. In the embodiment illustrated, the inner duct body 621 includes a hollow cylinder shape revolved about the exhaust axis 605. In other embodiments, the inner duct body 621 may include other hollow prism shapes, such as a hollow right triangular prism or a hollow right square prism. The inner duct body 621 includes an inner duct first end 622 and an inner duct second end 624. The inner duct first end 622 couples to the exhaust 500 of the gas turbine engine 100. The inner duct second end 624 is located within the outer duct body 611 between the outer duct first end 612 and the outer duct second end 614.

The inner duct seal 625 extends from the inner duct body 621 to the outer duct body 611. The inner duct seal 625 may generally extend radially outward from the inner duct body 621 relative to the exhaust axis 605. The inner duct seal 625 may be located adjacent, such as at or near, the inner duct second end 624. In the embodiment illustrated, the inner duct seal 625 is located at the inner duct second end 624. The inner duct seal 625 is positioned within the outer duct body 611 between the outer duct second end 614 and the mixed exhaust port 616. This positioning may be an axial positioning relative to the exhaust axis 605.

The inner duct seal 625 is configured to prevent exhaust and air from leaking between plenums formed on either side of the inner duct seal 625. The inner duct seal 625 may include an inner duct flange 626, an inner duct seal ring 627, and a sealing portion 629. The inner duct flange 626 may be an annular plate extending radially outward from inner duct body 621 towards outer duct body 611. The inner duct flange 626 may be positioned adjacent, such as at or near, the inner duct second end 624. The inner duct flange 626 may be formed as an integral piece with the inner duct body 621 or may be joined to the inner duct body 621 by a metallurgical bond, such as a weld. The inner duct seal ring 627 may be a solid of revolution located at the radially outer end of the inner duct flange 626. The inner duct seal ring 627 may include a C shaped cross section with the ends of the C shape facing inward. The inner portion of the inner duct seal ring 627 may be joined to the inner duct flange 626 by a metallurgical bond, such as a weld. The sealing portion 629 may be mounted, such as by coupling, to the outer surfaces of the inner duct seal ring 627. The sealing portion 629 may also include a C shape and may extend around the C shape of the inner duct seal ring 627.

The inner duct ring 628 is located between the inner duct seal 625 and the inner duct first end 622. The inner duct ring 628 is also positioned within the outer duct body 611 between the outer duct first end 612 and the mixed exhaust port 616. The inner duct ring 628 extends outward from the inner duct body 621 towards the outer duct body 611 forming an air gap 644 with the outer duct body 611. The inner duct ring 628 may be joined to the inner duct body 621 by a metallurgical bond, such as a weld. The inner duct body 621 may form a lower exhaust plenum 642, while the outer duct body 611 may form an upper exhaust plenum 641. In the embodiment illustrated, the lower exhaust plenum 642 and the upper exhaust plenum 641 are cylindrical plenums. The lower exhaust plenum 642 is in flow communication with the exhaust collector 520 and may be adjacent the exhaust collector 520. The upper exhaust plenum 641 is in flow communication with the lower exhaust plenum 642 and may be in flow communication with the lower exhaust plenum 642.

The exhaust fume isolator 640 also includes an isolation chamber 643. The isolation chamber 643 may be adjacent the mixed exhaust port 616 and may be located between the outer duct 610 and the inner duct 620 where the outer duct 610 and the inner duct 620 overlap in the telescoping configuration. The outer duct body 611, the inner duct body 621, the inner duct seal 625, and the inner duct ring 628 are configured to form the isolation chamber 643. The isolation chamber 643 may be bound on one side by the inner duct seal 625 and may be bound on the opposite side by the inner duct ring 628 and the air gap 644. In the embodiment illustrated, the isolation chamber 643 is an annular plenum. The air gap 644 is an air inlet to the isolation chamber 643. The mixed exhaust ports 616 form an outlet from the isolation chamber 643 to the mixed exhaust ducting 630.

The mixed exhaust ducting 630 is in flow communication with the isolation chamber 643. The mixed exhaust ducting 630 also includes a mixed exhaust inlet 636. The mixed exhaust ducting 630 may be formed of multiple ducts and may include a mixed exhaust inlet 636 at each mixed exhaust port 616. In the embodiment illustrated, the ducts of the mixed exhaust ducting 630 manifolds into a single duct before extending into the enclosure exhaust 27 and terminating at the mixed exhaust outlet 634. In other embodiments, each duct of the mixed exhaust ducting 630 may extend from the mixed exhaust port 616 to the enclosure exhaust 27. The exhaust fume isolator 640 may also include the ventilator 28 that is configured to create a negative pressure at the mixed exhaust inlet 636. The ventilator 28 may also be used for other purposes, such as the ventilation of the enclosure 25 including the heat ventilation of the enclosure 25.

Referring to FIG. 2, the gas turbine engine 100 also includes a shaft 120, a gas producer or compressor 200, a combustor 300, a turbine 400, and a power output coupling 130. The gas turbine engine 100 may have a single shaft or a dual shaft configuration.

The compressor 200 includes a compressor rotor assembly 210, compressor stationary vanes ("stators") 250, and inlet guide vanes 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the first compressor stage.

The combustor 300 includes one or more injectors 310 and a combustion chamber 320.

The turbine 400 includes a turbine rotor assembly 410 and turbine nozzles 450. The turbine rotor assembly 410 mechanically couples to the shaft 120. In the embodiment illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. A turbine nozzle 450, such as a nozzle ring, axially precedes each of the turbine disk assemblies 420. Each turbine nozzle 450 includes multiple nozzle segments 451 grouped together to form a ring. Each turbine disk assembly 420 paired with the adjacent turbine nozzle 450 that precede the turbine disk assembly 420 is considered a turbine stage. Turbine 400 includes multiple turbine stages.

The turbine 400 may also include a turbine housing 430 and turbine diaphragms 440. Turbine housing 430 may be located radially outward from turbine rotor assembly 410 and turbine nozzles 450. Turbine housing 430 may include one or more cylindrical shapes. Each nozzle segment 451 may be configured to attach, couple to, or hang from turbine housing 430. Each turbine diaphragm 440 may axially precede each turbine disk assembly 420 and may be adjacent a turbine disk. Each turbine diaphragm 440 may also be located radially inward from a turbine nozzle 450. Each nozzle segment 451 may also be configured to attach or couple to a turbine diaphragm 440.

The exhaust 500 includes an exhaust diffuser 510 and an exhaust collector 520. The exhaust collector 520 may be coupled to the inner duct 620 at the inner duct first end 622.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 2, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500). Likewise, each turbine disk assembly 420 may be associated with a numbered stage.

Once compressed air 10 leaves the compressor 200, it enters the combustor 300, where it is diffused and fuel is added. Air 10 and fuel are injected into the combustion chamber 320 via injector 310 and combusted. Energy is extracted from the combustion reaction via the turbine 400 by each stage of the series of turbine disk assemblies 420. Exhaust gas 90 may then be diffused in exhaust diffuser 510, collected and redirected. Exhaust gas 90 exits the gas turbine engine 100 via an exhaust collector 520 and is directed into the exhaust ducting 600.

Referring to FIG. 3, the exhaust gas 90 may be directed through lower exhaust plenum 642 and into upper exhaust plenum 641. The exhaust gas 90 may separate into two flows, an exhaust to atmosphere 91 and an exhaust fume leakage 92. The exhaust to atmosphere travels through upper exhaust plenum 641 and exits to the atmosphere. In embodiments, the exhaust gas 90 is further processed (e.g., to reduce harmful emissions, and/or to recover heat from the exhaust gas 90) prior to exiting through the upper exhaust plenum 641.

A small portion of the exhaust fume leakage 92 may leak passed inner duct seal 625 and into isolation chamber 643 of the exhaust fume isolator 640. The mixed exhaust ducting 630 is configured to have a negative pressure. This negative pressure draws enclosure air 80 from the enclosure 25 and into the isolation chamber 643 where it mixes with the exhaust fume leakage 92. The negative pressure then draws the mixed exhaust 82 into the mixed exhaust ducting 630 at mixed exhaust inlet 636. The negative pressure may be created by locating the mixed exhaust outlet 634 adjacent the ventilator 28, which draws the enclosure air or mixed exhaust 82 located within the mixed exhaust ducting 630 out of the system and directs it out of the enclosure 25.

The exhaust fume leakage 92 may be contained within the exhaust fume isolator 640 by an incoming air face velocity of the enclosure air 80 entering the exhaust fume isolator 640 through the air gap 644 between the inner duct ring 628 and the outer duct body 611. The exhaust fume isolator 640 may be configured to redirect the ventilated enclosure air using a ventilator designated to ventilate the enclosure 25, such as the ventilator designated for the enclosure heat ventilation. As such, the exhaust fume isolator 640 may not require the use of additional power to operate outside of the power already consumed by the ventilator for the enclosure 25.

Using the exhaust fume isolator 640 to collect any exhaust fume leakage 92 and draw the exhaust fume leakage 92 into the mixed exhaust ducting 630 and out of the enclosure 25 may prevent exhaust fumes from entering the enclosure 25, which may prevent hazardous conditions for any operator that may enter the enclosure 25, even when the sealing portion 629 of the inner duct seal 625 is completely worn out. The use of an exhaust fume isolator 640 in a gas turbine engine cell 20, such as a test cell, may satisfy regulatory requirements, such as OSHA requirements, for the hazardous fume removal, which may allow for the capacity of the ventilator 28 to be reduced.

The preceding detailed description is merely exemplary in nature and is not intended to limit the invention or the application and uses of the invention. The described embodiments are not limited to use in conjunction with a particular type of gas turbine engine. Hence, although the present disclosure, for convenience of explanation, depicts and describes a particular gas turbine engine cell with an exhaust fume isolator, it will be appreciated that exhaust fume isolator in accordance with this disclosure can be implemented in various other configurations, can be used with various other types of gas turbine engines, and can be used with other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A cell for a gas turbine engine, the cell comprising:
   an enclosure including an enclosure exhaust that is configured to draw a fluid from an inside of the enclosure and discharge the fluid to an outside of the enclosure;
   an outer duct including
      an outer duct body including an outer first end located within the enclosure, and an outer duct second end located distal to the outer duct first end and outside of the enclosure, and
      a mixed exhaust port extending through the outer duct body and located within the enclosure;
   an inner duct including
      an inner duct body including an inner duct first end that is configured to couple to an exhaust collector of the gas turbine engine, and an inner duct second end located within the outer duct body and distal to the inner duct first end, the outer duct second end being in fluid communication with the exhaust collector of the gas turbine engine via the inner duct,
      an inner duct seal extending from the inner duct body to the outer duct body, the inner duct seal being positioned within the outer duct body between the outer duct second end and the mixed exhaust port, and
      an inner duct ring extending outward from the inner duct body toward the outer duct body and forming a gap with the outer duct body, the inner duct ring being positioned within the outer duct body between the outer duct first end and the mixed exhaust port; and
   an exhaust fume isolator including
      an isolation chamber defined by the outer duct body, the inner duct body, the inner duct seal, and the inner duct ring, the isolation chamber being located adjacent to the mixed exhaust port, the mixed exhaust port being in fluid communication with the inside of the enclosure via the isolation chamber, and
      mixed exhaust ducting including a mixed exhaust inlet joined to the outer duct at the mixed exhaust port, and a mixed exhaust outlet being fluidly coupled to the outside of the enclosure exhaust.

2. The cell of claim 1, wherein the exhaust fume isolator includes a plurality of the mixed exhaust ports and the mixed exhaust ducting includes a plurality of the mixed exhaust inlets including one mixed exhaust inlet for each mixed exhaust port of the plurality of the mixed exhaust ports.

3. The cell of claim 2, wherein the mixed exhaust ducting manifolds to direct a mixed exhaust from the isolation chamber to the mixed exhaust outlet.

4. The cell of claim 1, wherein the mixed exhaust outlet is positioned adjacent to a ventilator for the cell, and
   wherein the ventilator creates a pressure within the mixed exhaust ducting that is less than a pressure outside the enclosure.

5. The cell of claim 4, wherein the ventilator is an exhaust fan.

6. The cell of claim 1, wherein the outer duct is joined to a roof of the enclosure.

7. The cell of claim 1, wherein the inner duct is movable within the outer duct in a telescoping manner to facilitate installation of the gas turbine engine within the enclosure.

8. A cell for a gas turbine engine, the cell comprising:
   an enclosure including a roof, an enclosure air inlet, and an enclosure exhaust, the enclosure exhaust including a ventilator that is configured to draw a fluid from an inside of the enclosure and discharge the fluid to an outside of the enclosure;
   inlet ducting extending through the enclosure and configured to couple to an inlet of the gas turbine engine; and
   exhaust ducting including
      an outer duct including
         an outer duct body extending through the roof, the outer duct body including an outer duct first end located within the enclosure and an outer duct second end located outside of the enclosure, and
         a mixed exhaust port extending through the outer duct body, an inner duct including
         an inner duct body including an inner duct first end that is configured to couple to an exhaust of the gas turbine engine and an inner duct second end that is positioned within the outer duct body, the outer duct second end being in fluid communication with the exhaust of the gas turbine engine via the inner duct,
         an inner duct seal extending from the inner duct body to the outer duct body, the inner duct seal being positioned within the outer duct between the outer duct second end and the mixed exhaust port, and
         an inner duct ring extending from the inner duct body toward the outer duct body and forming a gap with the outer duct body, the inner duct ring being positioned within the outer duct body between the outer duct first end and the mixed exhaust port, and
      mixed exhaust ducting extending from the mixed exhaust port to the enclosure exhaust,
   the outer duct body, the inner duct body, the inner duct seal, and the inner duct ring defining an isolation chamber, the mixed exhaust port being in fluid communication with the inside of the enclosure via the isolation chamber,
   the isolation chamber being in fluid communication with the outside of the enclosure via the mixed exhaust ducting.

9. The cell of claim 8, wherein the exhaust ducting includes a plurality of the mixed exhaust ports.

10. The cell of claim 9, wherein the mixed exhaust ducting manifolds to direct a mixed exhaust from the isolation chamber to the outside of the enclosure.

11. The cell of claim 8, wherein the mixed exhaust ducting includes a mixed exhaust inlet joined to the outer duct body at the mixed exhaust port.

12. The cell of claim 8, wherein the ventilator is an exhaust fan.

13. The cell of claim 12, wherein the outer duct is joined to the roof.

14. Exhaust ducting for a gas turbine engine cell including an enclosure with an enclosure exhaust, a ventilator, and a gas turbine engine located within the enclosure and including an exhaust collector, the exhaust ducting comprising:
- an upper plenum having an upper plenum first end located within the enclosure and an upper plenum second end located distal to the upper plenum first end and outside of the enclosure;
- a lower plenum having a lower plenum first end that is located adjacent to the exhaust collector and that is fluidly coupled to the exhaust collector, and a lower plenum second end that is located within the upper plenum and distal to the lower plenum first end, the upper plenum second end being in fluid communication with the exhaust collector via the lower plenum;
- a mixed exhaust port extending through the upper plenum and located within the enclosure;
- an inner duct seal extending from the lower plenum to the upper plenum, the inner duct seal being positioned within the upper plenum between the upper plenum second end and the mixed exhaust port; and
- an exhaust fume isolator including
  - an isolation chamber defined by the upper plenum, the lower plenum, and the inner duct seal, the isolation chamber being located adjacent to the upper plenum and in flow communication with an inside of the enclosure, and
  - mixed exhaust ducting in flow communication with the isolation chamber, the mixed exhaust ducting extending from the isolation chamber to the enclosure exhaust and terminating adjacent to the ventilator, the isolation chamber being in fluid communication with an outside of the enclosure via the mixed exhaust ducting.

15. The exhaust ducting of claim 14, wherein the upper plenum is formed by an outer duct and the lower plenum is formed by an inner duct extending partially into the outer duct in a telescoping configuration.

16. The exhaust ducting of claim 15, wherein the isolation chamber is located between the outer duct and the inner duct where the outer duct and the inner duct overlap in the telescoping configuration.

17. The exhaust ducting of claim 16, further comprising an inner duct ring positioned within the outer duct and extending from the inner duct toward the outer duct forming a gap with the outer duct, wherein the isolation chamber is bound on one side by the inner duct seal and is bound on an opposite side by the inner duct ring and the gap.

18. The exhaust ducting of claim 14, wherein the ventilator is an exhaust fan.

* * * * *